(12) United States Patent
Ramirez et al.

(10) Patent No.: US 10,387,831 B2
(45) Date of Patent: Aug. 20, 2019

(54) SYSTEM AND METHOD FOR ITEM CONSOLIDATION

(71) Applicant: Walmart Apollo, LLC, Bentonville, AR (US)

(72) Inventors: Jeremy C. Ramirez, Centerton, AR (US); Jessica Solana, Bentonville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 15/917,270

(22) Filed: Mar. 9, 2018

(65) Prior Publication Data

US 2018/0260770 A1 Sep. 13, 2018

Related U.S. Application Data

(60) Provisional application No. 62/470,023, filed on Mar. 10, 2017.

(51) Int. Cl.
*H04W 4/021* (2018.01)
*G06Q 10/08* (2012.01)
*G05B 19/418* (2006.01)
*G06F 16/28* (2019.01)

(52) U.S. Cl.
CPC ....... *G06Q 10/087* (2013.01); *G05B 19/4183* (2013.01); *G06F 16/285* (2019.01); *H04W 4/021* (2013.01)

(58) Field of Classification Search
CPC .................. G06Q 10/087; G06Q 10/08
See application file for complete search history.

(56) References Cited

U.S. PATENT DOCUMENTS

| | | | |
|---|---|---|---|
| 6,230,028 B1 * | 5/2001 | Shirakawa | H04M 1/0214 455/566 |
| 6,786,404 B1 | 9/2004 | Bonner et al. | |
| 7,221,276 B2 | 5/2007 | Olsen, III et al. | |
| 7,377,429 B2 | 5/2008 | Anderson et al. | |
| 8,843,231 B2 | 9/2014 | Ragusa et al. | |
| 9,280,756 B2 * | 3/2016 | Hara | G05B 15/02 |
| 9,665,899 B1 * | 5/2017 | Nair | G06Q 30/0639 |
| 9,733,633 B2 * | 8/2017 | Wickham | G05B 15/02 |
| 2003/0006280 A1 * | 1/2003 | Seita | G06K 7/0008 235/380 |
| 2004/0153379 A1 * | 8/2004 | Joyce | G06Q 10/08 705/28 |
| 2006/0142895 A1 * | 6/2006 | Waddington | G06F 17/30902 700/216 |

(Continued)

*Primary Examiner* — Paul Danneman
(74) *Attorney, Agent, or Firm* — Venable LLP; Jeffri A. Kaminski (57) ABSTRACT

Systems, methods, and computer-readable storage media for improved warehouse operations are provided. A consolidation processor (manual or automatic) establishes a connection to a warehouse management system. The current collection location of the consolidation processor may maybe established either manually or by automatically transmitting their current physical location in a facility to the warehouse management system. The warehouse management system may then direct the consolidation processor to a collection location to collect items for consolidation. This direction may be given based on one or more parameters.

14 Claims, 3 Drawing Sheets

(56) References Cited

U.S. PATENT DOCUMENTS

| | | | |
|---|---|---|---|
| 2006/0213167 A1* | 9/2006 | Koselka | A01D 46/30 56/10.2 A |
| 2006/0255951 A1* | 11/2006 | Roeder | B62B 3/06 340/572.7 |
| 2008/0215179 A1* | 9/2008 | Yair | G06Q 10/08 700/215 |
| 2010/0036521 A1* | 2/2010 | Schafer | B65G 1/1378 700/216 |
| 2010/0218131 A1* | 8/2010 | Holm-Petersen | G06Q 10/087 715/771 |
| 2013/0017790 A1* | 1/2013 | Oba | H04L 63/0492 455/41.2 |
| 2013/0273843 A1* | 10/2013 | Shimota | G06Q 20/3278 455/41.1 |
| 2013/0317642 A1* | 11/2013 | Asaria | G06Q 10/08 700/216 |
| 2014/0125591 A1* | 5/2014 | Sawai | G06F 3/033 345/157 |
| 2014/0279294 A1 | 9/2014 | Field-Darragh et al. | |
| 2014/0344116 A1 | 11/2014 | Paracha et al. | |
| 2014/0351101 A1* | 11/2014 | Danelski | G06Q 10/087 705/28 |
| 2015/0052019 A1* | 2/2015 | Field-Darraugh | G06Q 30/0635 705/26.62 |
| 2015/0081088 A1* | 3/2015 | Lyon | G06Q 10/0875 700/216 |
| 2015/0106224 A1* | 4/2015 | Stevens | G06Q 30/0631 705/26.7 |
| 2015/0110343 A1 | 4/2015 | Worth, II | |
| 2015/0294395 A1 | 10/2015 | Deshpande et al. | |
| 2015/0307278 A1* | 10/2015 | Wickham | G05B 15/02 700/216 |
| 2015/0375398 A1* | 12/2015 | Penn | G06Q 10/08 700/218 |
| 2016/0145045 A1* | 5/2016 | Mountz | B65G 1/1378 700/216 |
| 2016/0176635 A1* | 6/2016 | Varley | B65G 1/137 700/216 |
| 2016/0176637 A1* | 6/2016 | Ackerman | B65G 1/1375 700/215 |
| 2016/0260158 A1* | 9/2016 | High | E01H 5/12 |
| 2017/0278055 A1* | 9/2017 | Winkler | G06Q 10/087 |
| 2018/0059635 A1* | 3/2018 | Johnson | G06Q 10/087 |
| 2018/0127211 A1* | 5/2018 | Jarvis | G06Q 10/08 |
| 2018/0211347 A1* | 7/2018 | Chen | G06Q 50/28 |
| 2018/0218311 A1* | 8/2018 | Kumar | G06Q 10/087 |
| 2018/0218441 A1* | 8/2018 | Kumar | G06Q 30/0639 |
| 2018/0276605 A1* | 9/2018 | Siebrecht | G06Q 10/087 |

* cited by examiner

SYSTEM AND METHOD FOR ITEM CONSOLIDATION

BACKGROUND

1. Technical Field

The present disclosure relates in general to systems and methods for processing items for shipment, and in particular, to dynamic processes and systems useful for warehouse and inventory management.

2. Introduction

In the drive to increase the efficiency and profitability of retail operations, improving the management of warehouse and inventory activities is often overlooked. Among the most time consuming and costly operations in a warehouse is 'order picking'—an activity that essentially involves the retrieval of items from their warehouse storage locations by "pickers" to fill customer orders. When tasked with a customer order, an order picker travels to and between pick locations, searches for items on the order, retrieves them, and direct them towards further downstream sorting. The picked orders are grouped at a collection location(s) based on order priority, item size and other parameters. The collection locations may include items for multiple customer orders.

Consolidation processors, be they manual or automatic, freely travel from one collection location to another. The consolidation processor collects items from the collection location, and is directed by a warehouse management system to sort units into particular consolidation locations. This process is sometimes referred to as "putting" items. The consolidation locations may be assigned to a particular customer or order. Once all the items for an order or customer are arrive at the consolidation location, the order is ready for additional downstream processing, packaging, and shipping processes.

The consolidation processor is currently unaware of the specific priority of an item within a collection location, and is not directed to the optimal collection location or item within a collection location. With the current process, there are inefficiencies with the order completion process. For example, not all of the items at the collection location may be ready for processing. The consolidation processor may guess and check which item at the collection location is ready, as well as which item is the highest priority. This may be done by scanning a label or code on the item. A query is sent to the system database, which returns information about the item to the processor. The selected item may not be an item ready for processing. This results in numerous, unnecessary queries to the database. In addition, the lack of intelligence regarding the items at the collection location impairs the consolidation process.

In light of the above need, embodiments of the present invention provide dynamic processes and systems capable of improving the operation and efficiency of warehouse management systems, on a rolling real-time basis. Embodiments of the invention may be useful for managing warehouse and inventory operations, and specifically in connection with order fulfillment.

SUMMARY

Disclosed herein are systems, methods, and computer-readable storage mediums for improved inventory management. An exemplary method can include receiving information about items at each respective consolidation location, the information including an item priority and an associated customer for each respective item, wherein items associated with different customers are located at the same consolidation location; receiving location information regarding a current location of a consolidation processor; determining a number of items available for consolidation at each consolidation location in an area around the current location of consolidation processor; determining a distance from the current location of the consolidation processor to the consolidation locations with available items; determining an order priority for each consolidation location based on the item priority of the available items at that consolidation location; receiving a weight for the distance, the order priority of each consolidation location and the number of items available for each consolidation location; determining a priority score based on the distance, the order priority of each consolidation location and the number of items available for each consolidation location and the respective weights; providing instructions to the consolidation processor to proceed to the consolidation location with a highest priority score; providing instructions to the consolidation processor to scan items at that consolidation location based on whether the item completes an order, whether the item is the next to last step in completing the order and whether the item is starting an order; receiving information scanned from the items; and processing the scanned information.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Embodiments of the invention are related to processing items in retail facilities (particularly, in the warehouses thereof). Tasks or orders are received at a facility from one or more sources; then sorted, scheduled, and assigned to processors, and in a manner that reduces delay, promotes a more economic allocation of resources, and simplifies task performance. Comprehensive data for performing each task are monitored rigorously to ensure optimum performance.

In one implementation, a consolidation processor (manual or automatic, such as a robot, AGV, UAV, etc.) establishes a connection to a warehouse management system. The current location of the consolidation processor may be established either manually or by automatically transmitting their current physical location in a facility to the warehouse management system. The warehouse management system may then direct the consolidation processor to a collection location to collect items for consolidation. This direction may be given based on one or more parameters.

Exemplary parameters may include one or more of:

Processor current location—this is the physical location of the consolidation processor in the facility; this parameter may be used to calculate the distance of the processor(s) from each collection location(s);

Available Units—the total items contained in a collection location available for sortation/consolidation;

Order Priority—the priority level of items contained in the collection location(s) and the items associated with their destined consolidation location(s);

More, less or different combinations of parameters may also be used depending on a particular implementation.

The consolidation processor receives instructions and then physically moves to the collection location indicated by the system. At the directed collection location, the consolidation processor may be further guided by the warehouse management system to process item(s) contained in the collection location based off order priority, which is the calculated priority level of items contained in the collection location(s) and the orders associated with the destined consolidation location(s).

An "order" (or "task") may be an express or implied requisition to perform one or more tasks. An example of an "order" is a "service ticket" generated manually or automatically by warehouse management software, expressly requesting an inventory count of a particular product or SKU, or to restock certain shelves or bins, or to unload an incoming shipment at a particular docking zone. Another example is a "purchase order," generated online through a retail website or other e-commerce portal, expressly requesting delivery of purchased "item(s)," and thus, implicitly requiring the retrieval by consolidation processors of the item(s) (in addition to other upstream and downstream order fulfillment tasks).

Aside from e-commerce facilities, another example of a task-generator would be, as mentioned hereinabove, an "inventory management system" (also known as an "inventory control system"). An inventory management system is a set of hardware of software based tools that automate the process of tracking inventory. The kinds of inventory tracked with an inventory management system can include almost any type of quantifiable good, including food, clothing, books, equipment, and any other item that consumers, retailers, and wholesalers may purchase. Inventory management systems typically work in real time to electronically transmit information immediately to and from a central computer as buying, selling, and shipping transactions occur.

It will be appreciated that warehouse management systems and inventory management systems—especially for global retailers such as Wal-Mart Stores, Inc.—can be massive in their functionality, scale, and deployment. Record keeping, inventory tracking, and logistics will, in respect of activity likely predominate other functions, such as the assignment of tasks to workers. Nonetheless, for embodiments of the present invention, warehouse management systems are an expected and likely source of tasks.

It will also be appreciated that, although "warehouse management systems," "inventory management systems" and "e-commerce retail facilities" may be separate entities, it not uncommon in practice that these are enmeshed, merged, interlinked, interconnected, or fully and seamlessly integrated.

Embodiments of the invention provide dynamic warehouse management processes for processing items in a warehouse. The warehouse tasks (e.g., picking, putting, restocking, unloading, and tracking) typically originate from one or more task-generators (e.g., online purchasing and fulfillment facilities, inventory management systems, etc.) and are executed in a warehouse by a team of consolidation processors. As illustrated schematically in FIG. 1, the management process comprises several steps, which—in typical high-volume commercial practices employing high-speed digital communications, processors, and databases—will often be performed contemporaneously in a virtually seamless and continuous rate, thus achieving an "always on" presence.

Figure 1:
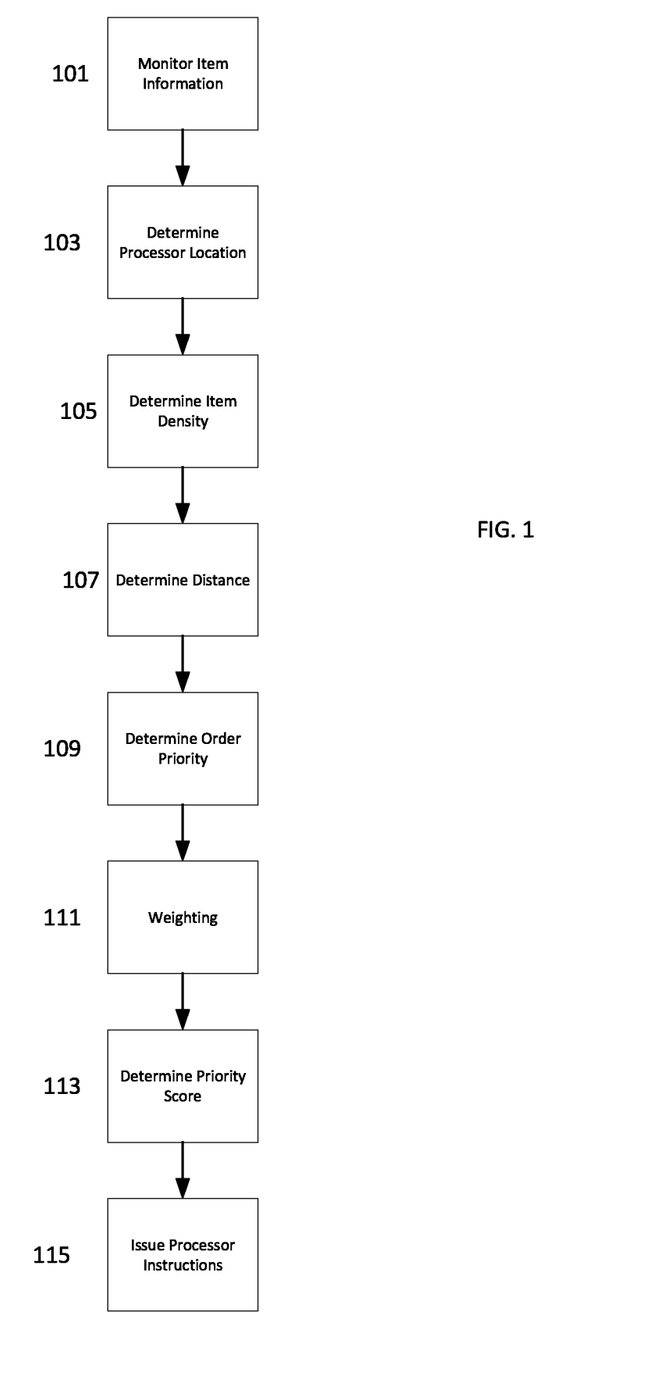
FIG. 1 illustrates an example flow.

According to the process, information about the items at the collection locations is monitored. The information may have been collected during upstream processing, such as during item intake at the facility or during the picking process. The information may include data such as the item's priority, customer, and date of receipt. All of the information may be collected and monitored by the warehouse management system.

As used herein, a "priority may be any information representative of a temporal parameter, or other variable capable of influencing the scheduling of a task. Examples include: time-stamps; deadlines; priority codes (e.g., "urgent", "immediate", "low"); SLA ("Service Level Agreements") reference (i.e., to the extent such agreements may call for "rush" orders" or "expedited delivery"; and common carrier codes (i.e., to the extent that certain common carriers may impose deadlines to meet their delivery requirements).

In addition, the status of each of the consolidation processors is monitored. The status may include the progress of a consolidation processor in completing a task, their availability for new tasks, and the processor's location in the warehouse. The status may be monitored by the warehouse management system as described above. For example, the processor may scan a location or sign in to the warehouse management system at a location. In addition, the location may be monitored using GPS and other location tracking techniques. The location information may be used to determine which processor to send to geographic locations within the facility where they are needed.

Several means are available for monitoring status information of items in the facility and the consolidation processor. For example, a system may employ a local computer network (i.e., at a warehouse) with several local wireless nodes and WAN access to larger computer facilities hosted remotely offsite at, for example, a corporation's global or regional headquarters. In such a system, certain status information (i.e., those that tend to be static, such as "skills" and "certifications") can be entered and stored at a data center; while other status information (i.e., those that tend to be ephemeral, such as "location" and "current activity") can be tracked locally (e.g., through the use of handheld scanning devices that transmit and receive information to and from the local computer network through its wireless nodes). Preferably, the transmission of ephemeral status information will call automatically for, and thus be supplemented with, the stored status information.

The frequency and degree to which status information is monitored will vary depending on the means employed. For comparatively small operations, the monitoring of only a few fields of basic status information may be desirable. By hosting this information locally, network and system bandwidth requirements can be reduced, and monitoring executed more frequently. In contrast, for larger operations, more comprehensive status information may be appropriate. Where several fields of Information are employed, distributing and sharing the information among local and remote resources may be desirable. For such, the frequency of monitoring can be throttled down to accommodate the comparatively larger system and bandwidth requirements. The particular types of status information is also variable, and likely will be a function of an inventory's product profile.

In respect of "location", examples of status information particularly relevant to warehouse task management, include: "Zone", "lane", "aisle", "area", "building", and "floor". Such information can be tracked as a consolidation processor performs assigned tasks by, for example, equipping him with a handheld scanner device with location detection functionality, or more simply, by placing location tags throughout the warehouse that the worker can scan and upload to a warehouse management system. For certain warehouse operations, product labels may be sufficient alone to provide location data for the items, rendering unnecessary separate location tags.

Referring to FIG. 1, another parameter that may be used to determine a priority score may be the item density, 105. Item density is the number of items available at a particular collection location. The higher the item density, the more efficient it is to send a consolidation processor to that location.

Not all of the items at a location may be available for processing. Available items refers to those items at a collection location that are ready for downstream processing. By monitoring the status of the items at each location, the density of available items at each location may be determined. The raw number of available items or an adjusted/normalized number of available items may be used to determine the priority score. In determining item density, the location of the processor may be determined, for example, chute #5. The number of available items for processing at collection locations in the vicinity of the chute 5 may vary. There may be 50 items at chute 10 and 60 items at location 12. This raw number may serve as the basis for item density.

Another parameter that may be used to determine the priority score is distance, 107. The distance may be based on the distance to a collection location or other location from the consolidation processor's current location. The distance may be used to determine a raw distance score. The shorter the distance traveled, the higher the raw distance score. One or more raw distances may be combined into a single variable used to determine the distance parameter. The distance from the consolidation processor to an initial, and any subsequent, collection locations, and to the consolidation location may also be considered in determining the raw distance score. The system may monitor the location of consolidation processor as described above and can determine the distance from that location to collection locations. For example, it may be 10 meters to an initial collection location and then 5 meters to a subsequent collection location and then 8 meters to the consolidation location for the collected items. Another initial collection location may be 20 meters away.

Another parameter that may be used to determine a priority score for a collection location is an order priority, 109. Each item at a collection location is typically part of a larger order. The orders may be due today, two days from now, etc. The priority information for the items at a collection location is used to determine the order priority for that locations. The locations and status information regarding the items is monitored. Thus, it is know what items are at what locations, as well as those items' priorities. The order priority for the collection location may be an average of the order priorities for the items available at that collection location. For example, if the collection location has ten items available with respective priorities of 100, 100, 200, 500, 400, 500, 100, 300, 400, and 500, the average priority for the items and the order priority for the collection location is 310. The order priority for the collection location may also be the maximum priority for the items available at that collection location. In the example above, the order priority would have been 500.

Each of the parameters for a consolidation location and/or consolidation processor may be combined to determine a priority score for the collection location, 111-113. This may be done for every collection location near the consolidation processor, for example in the same zone. In the example embodiment, the parameters may be weighted based on a particular implementation and preferences. For example, if distance traveled is important to an organization, the weight for that parameter will be set high. Same or different weights may be used for each of the parameters. The following equation may be used to determine the priority score for a collection location:

$$\begin{aligned} \text{Score} &= W \cdot P \\ &= [w_1, w_2, w_3, \ldots, w_n] \cdot [p_1, p_2, p_3, \ldots, p_n] \\ &= w_1 p_1 + w_2 p_2 + w_3 p_3 + \ldots + w_n p_n \\ &= \sum_{i=1}^{n} w_i p_i \end{aligned}$$

Where w=weight

P=parameter

Once the priority score is determined the collection processor is directed to a collection location based on the priority scores for the collection locations, 115. The consolidation processor may be instructed to proceed directly to the collection location with the highest priority score. In another embodiment the collection locations may be ranked according to highest priority score. The consolidation processor may be provided a list of collections locations, for example, with high priority scores or score over a threshold, and is permitted to select a collection location to process. In another embodiment the system may direct the consolidation processor to a specific collection location when the priority score exceeds a threshold. This may occur when a collection location has a high density of high priority items in a location close to the consolidation processor. The system may determine that any location with a score over the threshold is an automatic assignment.

If at any point when determining the correct item to direct a user to, ties with another unit within the consolidation location, there should be tie breaker logic to proceed with flow. A first tie breaker may be the size of the unit, since it is quick and easy for the consolidation processor to recognize. The next tie breaker value may be the time stamp that the item arrived in the consolidation location. The consolidation processor may be directed to choose the unit that arrived first, to follow FIFO protocol.

The instructions and listings may be sent to a mobile device used by the consolidation processor or to the consolidation processor itself, for example when the consolidation processor is a robot. The consolidation processor proceeds to the designated collection location and scans the items at that location. As the consolidation processor scans and collects the items at the collection location, the system may update and recalculate the priority score for other processors.

Figure 2:
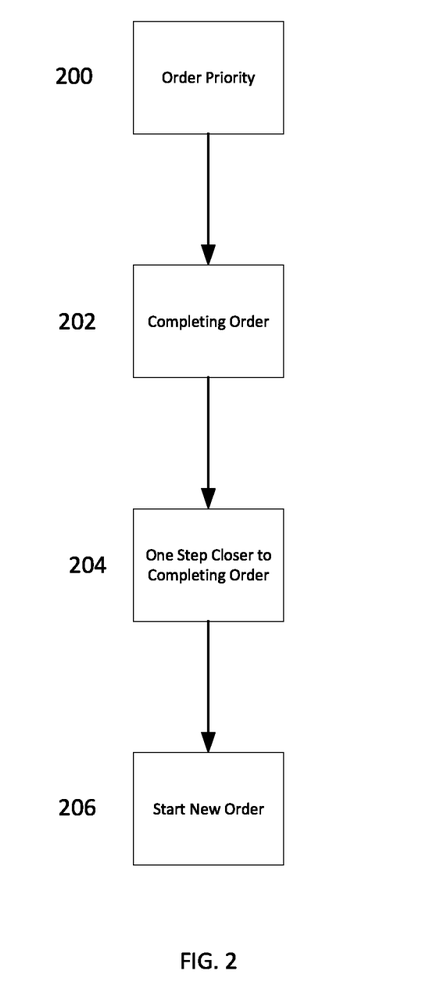
FIG. 2 illustrates an exemplary method embodiment.

In a further embodiment shown in FIG. 2, once the consolidation processor is directed to a collection location, the consolidation processor may be directed to specific items to "put" from the collection location. This may make those items available for the next step faster, promoting efficiency. The sequence initially may be based on the order priority, those with the highest priority are processed first, 200. If there is a tie in priority, other factors may include whether that item will complete an order 202, gets one step closer to completing an order 204, or starts an order 206. These factors may be ordered in any fashion as desired to prioritize the collection of items from the collection location. For example, there may be 20 items at the collection location, each item having the same or different priorities. The collection processor first directed to put the items that have the highest order priority. If remaining items have the same, next highest order priority, the next criteria may be if that item completes an order. Thus, if that item is put, the order is complete and ready for processing and shipping. The next criteria is if the item move the order one step closer to completion. The system knows what items are where and what the order status is. The status of the orders and what items are needed to complete an order may be determined from the status information monitored by the system. Next, if none of the other criteria are met, the consolidation processor may be directed to an item that starts an order. The items at the location are eventually all put and the processor may be provided with the next location for putting.

Figure 3:
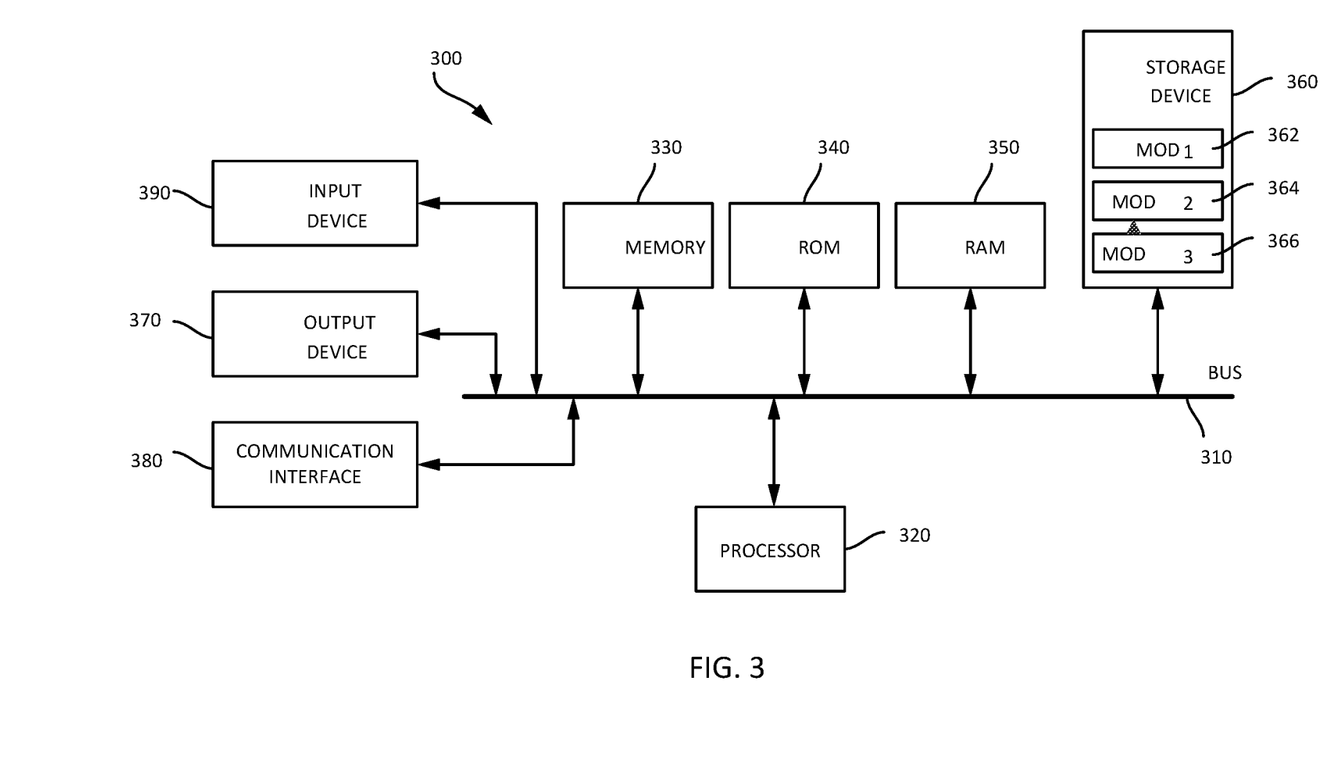
FIG. 3 illustrates an example computer system which can be used to perform embodiments of the invention.

FIG. 3 illustrates an example computer system which can be used to perform inventory management operations as disclosed herein. More specifically, FIG. 3 illustrates a general-purpose computing device 300, including a processing unit (CPU or processor) 320 and a system bus 310 that couples various system components including the system memory 330 such as read only memory (ROM) 340 and random access memory (RAM) 350 to the processor 320. The system 300 can include a cache 322 of high speed memory connected directly with, in close proximity to, or integrated as part of the processor 320. The system 300 copies data from the memory 330 and/or the storage device 360 to the cache 322 for quick access by the processor 320. In this way, the cache provides a performance boost that avoids processor 320 delays while waiting for data. These and other modules can control or be configured to control the processor 320 to perform various actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general purpose processor and a hardware module or software module, such as module 4 362, module 2 364, and module 3 366 stored in storage device 360, configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drives and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, bus 310, display 370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 300 is a small, handheld computing device, a desktop computer, or a computer server.

Although the exemplary embodiment described herein employs the hard disk 360, other types of computer-readable media which can store data that are accessible by a computer, such as magnetic cassettes, flash memory cards, digital versatile disks, cartridges, random access memories (RAMs) 350, and read only memory (ROM) 340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A computer implemented method of consolidating items from a plurality of consolidation locations, comprising:

receiving at a processor information about items at each respective consolidation location, the information including an item priority and an associated customer for each respective item, wherein items associated with different customers are located at the same consolidation location;

receiving at the processor location information regarding a location of a consolidation processor;

determining with the processor a number of items available for consolidation at each consolidation location in an area around the location of consolidation processor;

determining with the processor a distance from the location of the consolidation processor to each of the consolidation locations with available items;

determining with the processor an order priority for each consolidation location based on the respective item priorities of the available items at that consolidation location;

receiving at the processor, for each consolidation location, a respective weight for: the distance from the location of the consolidation processor to that consolidation location; the order priority of that consolidation location; and a number of items available at that consolidation location;

determining with the processor, for each consolidation location, a priority score based on the distance from that location of the consolidation processor to that consolidation location the order priority for that consolidation location, the number of items available at that consolidation location and each of the respective weights;

providing instructions to the consolidation processor to proceed to a designated consolidation location based on the priority scores and to scan items at that designated consolidation location;

receiving via a scanner information scanned from the items; and processing the scanned information.

2. The method of claim 1, further comprising wherein determining the order priority for each consolidation location is based on an average of the item priorities for the available items at that consolidation location or a maximum priority, depending on a setting in the system.

3. The method of claim 1, further comprising providing instructions to the consolidation processor to select items from the designated consolidation location based on the respective item priorities of the items available at the designated consolidation location and whether an item completes an order.

4. The method of claim 1, further comprising providing instructions to the consolidation processor to select items from the designated consolidation location based on whether an item is the next to last step in completing the order and whether an item is starting an order.

5. The method of claim 1, further comprising determining a zone for the consolidation processor based on the location of the consolidation processor and determining the distance to consolidation locations in that zone.

6. The method of claim 1, wherein the location of the consolidation processor is entered manually by the consolidation processor.

7. The method of claim 1, wherein the location is determined based on at least one of one GPS or Wi-Fi.

8. The method of claim 1, further comprising recalculating the order priority for remaining items at the designated consolidation location after one of the items at the designated consolidation location is scanned.

9. The method of claim 1, wherein the consolidation processor is a robot.

10. A computer implemented method of consolidating items from a plurality of consolidation locations, comprising:

receiving at a processor information about items at each respective consolidation location, the information including an item priority and an associated customer for each respective item, wherein items associated with different customers are located at the same consolidation location;

receiving at a processor location information regarding a current location of a consolidation processor;

determining with the processor a number of items available for consolidation at each consolidation location in an area around the current location of consolidation processor;

determining with the processor a distance from the current location of the consolidation processor to each of the consolidation locations with available items;

determining with the processor an order priority for each consolidation location based on the respective item priorities of the available items at that consolidation location;

receiving at the processor, for each consolidation location, a weight for: the distance from the location of the consolidation processor to that consolidation location; the order priority of that consolidation location; and a number of items available at that consolidation location;

determining with the processor, for each consolidation location, a priority score based on the distance from that location of the consolidation processor to that consolidation location the order priority for that consolidation location, the number of items available at that consolidation location, and each of the respective weights;

providing instructions to the consolidation processor to proceed to a designated consolidation location with a highest priority scores;

providing instructions to the consolidation processor to scan items at that consolidation location based on whether the item completes an order, whether the item is the next to last step in completing the order and whether the item is starting an order;

receiving via a processor information scanned from the items; and processing the scanned information.

11. The method of claim 10, wherein the location is entered manually by the consolidation processor.

12. The method of claim 10, wherein the location is determined based on at least one of one GPS or Wi-Fi.

13. The method of claim 10, further comprising recalculating the order priority for remaining items at the designated consolidation location after one of the items at the designated consolidation location is scanned.

14. A non-transitory computer-readable storage medium having instructions stored which, when executed by a computing device, cause the computing device to perform operations comprising:

receiving information about items at each respective consolidation location, the information including an item priority and an associated customer for each respective item, wherein items associated with different customers are located at the same consolidation location;

receiving location information regarding a location of a consolidation processor;

determining a number of items available for consolidation at each consolidation location in an area around the location of consolidation processor;

determining a distance from the location of the consolidation processor to each of the consolidation locations with available items;

determining an order priority for each consolidation location based on the respective item priorities of the available items at that consolidation location;

receiving, for each consolidation location, a respective weight for: the distance from the location of the consolidation processor to that consolidation location; the order priority of that consolidation location; and a number of items available at that consolidation location;

determining, for each consolidation location, a priority score based on the distance from that location of the consolidation processor to that consolidation location the order priority for that consolidation location, the number of items available at that consolidation location and each of the respective weights;

providing instructions to the consolidation processor to proceed to a designated consolidation location based on the priority scores and to scan items at that designated consolidation location;

receiving via a scanner information scanned from the items; and processing the scanned information.

* * * * *